United States Patent
Bumb

(10) Patent No.: US 11,224,836 B2
(45) Date of Patent: Jan. 18, 2022

(54) CARBON CAPTURE SOLVENTS HAVING ALCOHOLS AND AMINES AND METHODS FOR USING SUCH SOLVENTS

(71) Applicant: Carbon Clean Solutions Limited, Berkshire (GB)

(72) Inventor: Prateek Bumb, London (GB)

(73) Assignee: CARBON CLEAN SOLUTIONS LIMITED, Berkshire (GB)

(*) Notice: Subject to any disclaimer, the term of this patent is extended or adjusted under 35 U.S.C. 154(b) by 0 days.

(21) Appl. No.: 15/505,863

(22) PCT Filed: Aug. 21, 2015

(86) PCT No.: PCT/IB2015/001855
§ 371 (c)(1),
(2) Date: Feb. 22, 2017

(87) PCT Pub. No.: WO2016/027164
PCT Pub. Date: Feb. 25, 2016

(65) Prior Publication Data
US 2017/0274317 A1  Sep. 28, 2017

Related U.S. Application Data

(60) Provisional application No. 62/040,911, filed on Aug. 22, 2014.

(51) Int. Cl.
*B01D 53/62* (2006.01)
*B01D 53/14* (2006.01)
*B01D 53/78* (2006.01)

(52) U.S. Cl.
CPC ..... *B01D 53/1475* (2013.01); *B01D 53/1425* (2013.01); *B01D 53/1493* (2013.01); *B01D 2252/20415* (2013.01); *B01D 2252/20447* (2013.01); *B01D 2252/20484* (2013.01); *Y02C 20/40* (2020.08)

(58) Field of Classification Search
None
See application file for complete search history.

(56) References Cited

U.S. PATENT DOCUMENTS

2009/0031933 A1* 2/2009 Ookawa .................. B01D 53/62 110/345
2013/0164204 A1* 6/2013 Bumb ................ B01D 53/1418 423/232

OTHER PUBLICATIONS

"Safety Data Sheet for 2-amino-2-methyl-1-propanol." Spectrum Chemical Mfg. Corp., Aug. 16, 2017.*

* cited by examiner

Primary Examiner — Daniel Berns
(74) Attorney, Agent, or Firm — Greenberg Traurig LLP

(57) ABSTRACT

Methods and compositions useful, for example, for physical solvent carbon capture. The solvents may include an aqueous mixture of 2-amino-2-methylproponol, 2-piperazine-1-ethylamine, diethylenetriamine, 2-methylamino-2-methyl-1-propanol, and potassium carbonate or potassium carbonate buffer salt. The solvent may also contain less than about 75% by weight of dissolving medium (i.e., water) and may have a single liquid phase. The solvents and methods have favourable regeneration energies, chemical stability, vapour pressure, total heat consumption, net cyclic capacity, and reaction kinetics.

9 Claims, 9 Drawing Sheets

CARBON CAPTURE SOLVENTS HAVING ALCOHOLS AND AMINES AND METHODS FOR USING SUCH SOLVENTS

CROSS-REFERENCE TO RELATED APPLICATION DATA

This application is a national stage application, filed under 35 U.S.C. 371, of International Patent Application No. PCT/IB2015/001855, filed on Aug. 21, 2015, which claims the benefit of priority to U.S. Provisional Patent Application Ser. No. 62/040,911, which is incorporated herein by reference.

FIELD OF TECHNOLOGY

This application relates to carbon capture.

BACKGROUND

Separating $CO_2$ from gas streams has been commercialized for decades in food production, natural gas sweetening, and other processes. Aqueous monoethanolamine (MEA) based solvent capture is currently considered to be the best commercially available technology to separate $CO_2$ from exhaust gases, and is the benchmark against which future developments in this area will be evaluated. Unfortunately, amine-based systems were not designed for processing the large volumes of flue gas produced by a pulverized coal power plant. Scaling the amine-based $CO_2$ capture system to the size required for such plants is estimated to result in an 83% increase in the overall cost of electricity from such a plant.

Accordingly, there is always a need for an improved solvent.

SUMMARY

Embodiments described herein include, for example, compounds and compositions, and methods of making and methods of using the compounds and compositions. Systems and devices can also be provided which use these compounds and compositions and relate to the methods. For illustration, this disclosure relates to a carbon capturing solvent (an example termed "APBS") and methods for treating industrial effluent gases using the solvent. The solvent disclosed herein removes $CO_2$ at a more efficient rate than MEA and degrades at a rate lower than other solvents (e.g., MEA).

In one embodiment, the composition and method disclosed herein may be implemented at various types of industrial plants, including power plants, for example. In one example, the solvent may include an aqueous mixture of 2-amino-2 methylpropanol, 2-piperazine-ethylamine, diethylenetriamine, 2-methylamino-2-methyl-1-propanol, and potassium carbonate buffer salt. The composition may also contain less than about 75% by weight of a dissolving medium (i.e., water) and may have a single liquid phase. In another example, the solvent may include an aqueous mixture of an amino hindered alcohol, a polyamine with three or more amino group and a carbonate buffer salt.

Additional features of the present disclosure will become apparent to those skilled in the art upon consideration of the following detailed description exemplifying the best mode for carrying out the disclosure.

BRIEF DESCRIPTION OF THE DRAWINGS

Embodiments of compositions, systems, and methods are illustrated in the figures of the accompanying drawings which are meant to be exemplary and not limiting, in which like references are intended to refer to like or corresponding parts, and in which.

DEFINITIONS

Figure 1:
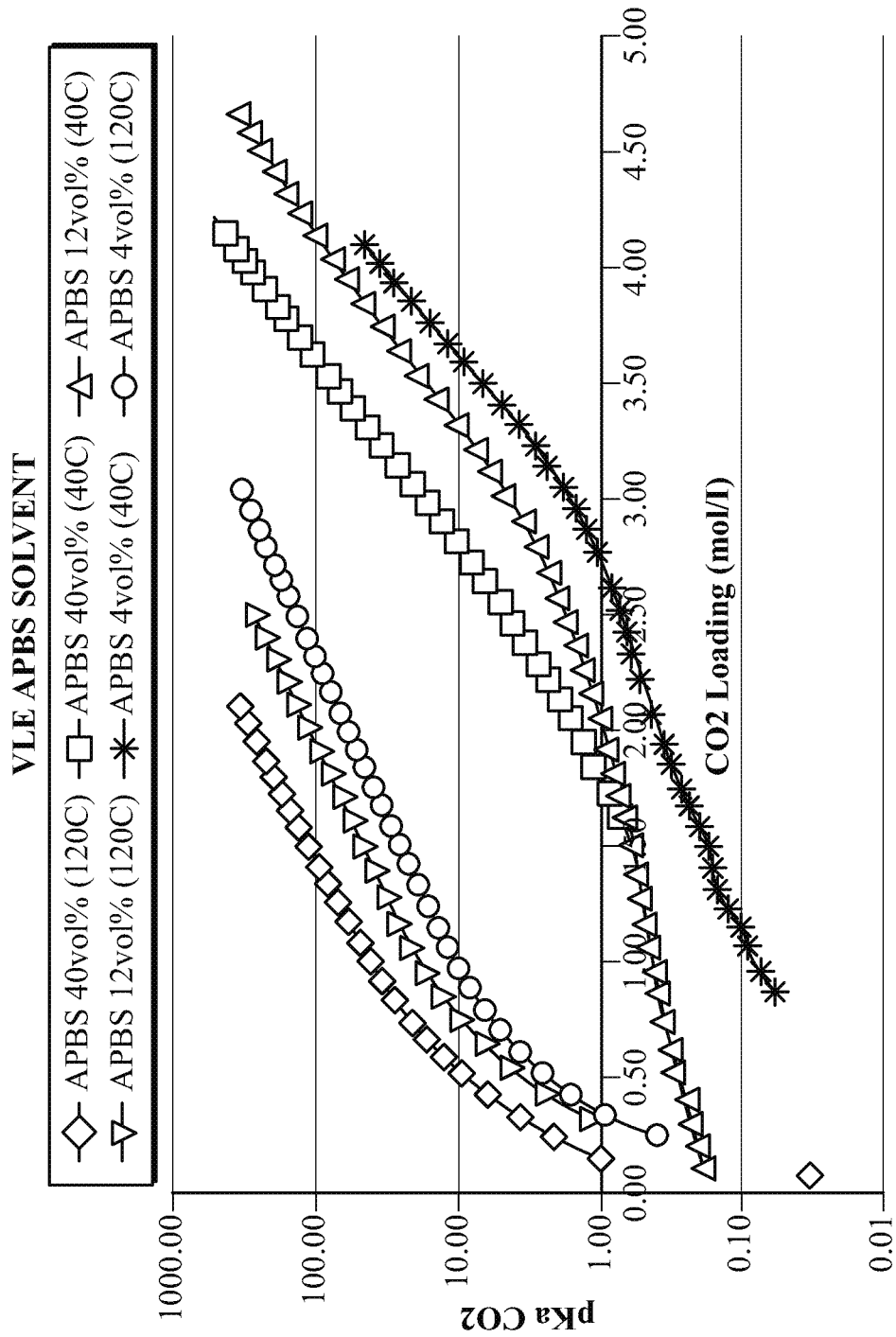
FIG. 1 illustrates APBS vapor liquid equilibrium data at 40 C and 120 C to determine CO2 loading (mol/L) versus the partial pressure of $CO_2$ (kPa)
Figure 2:
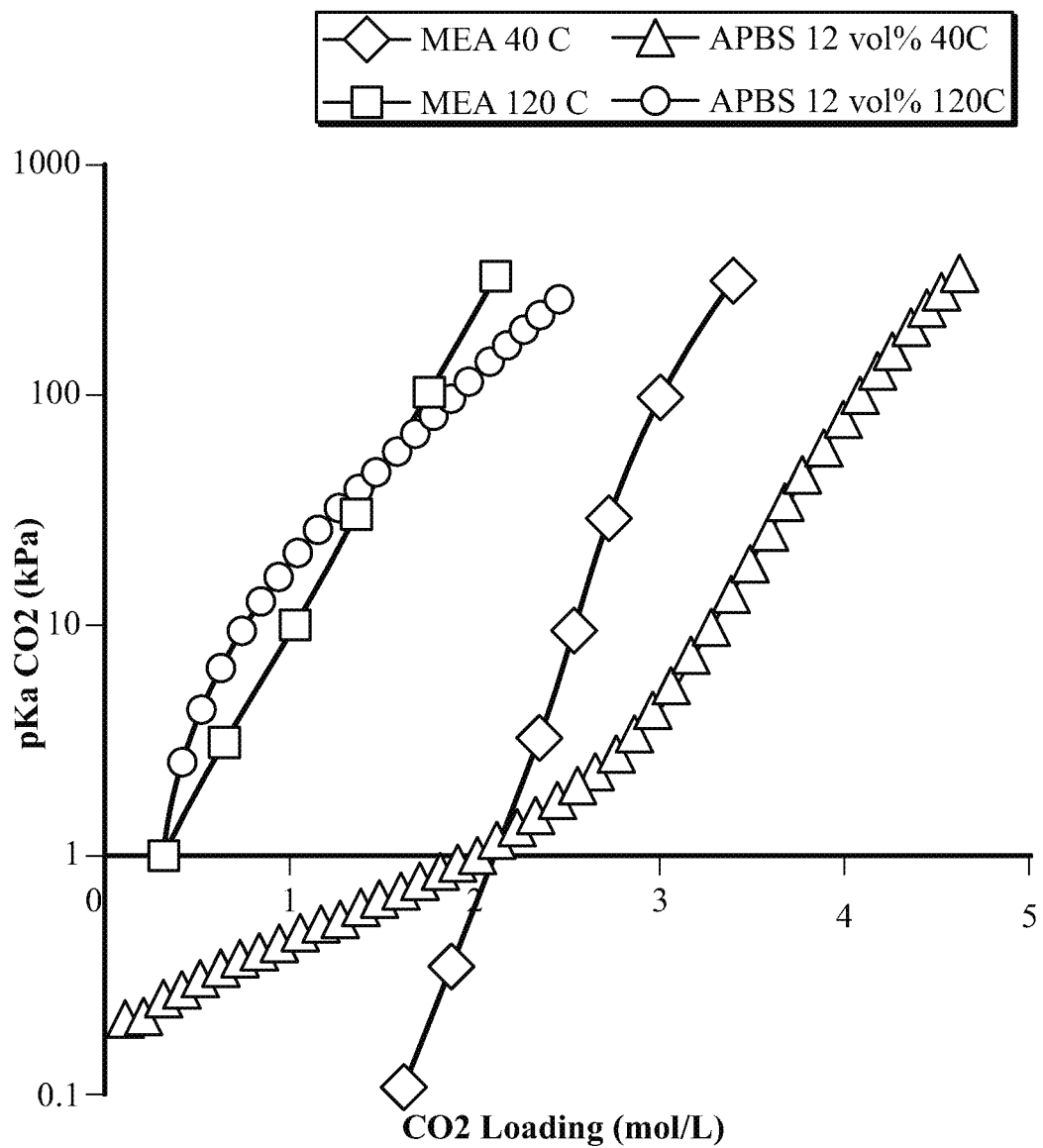
FIG. 2 illustrates APBS solvent vapor liquid equilibrium data as compared to MEA according to the present disclosure.

As used herein, the term "solvent" can refer to a single solvent or a mixture of solvents and may be used interchangeable with the term "composition."

DETAILED DESCRIPTION

The detailed description of aspects of the present disclosure set forth herein makes reference to the accompanying drawings and pictures, which show various embodiments by way of illustration. The detailed description herein is presented for purposes of illustration only and not of limitation. For example, the steps recited in any of the method or process descriptions may be executed in any order and are not limited to the order presented. Moreover, references to a singular embodiment may include plural embodiments, and references to more than one component may include a singular embodiment.

Generally, this disclosure provides a composition and a method of using the composition to reduce or eliminate $CO_2$ emissions from a process stream, e.g., as coal-fired power plants, which burn solid fuels. The solvent and method disclosed herein capture/sequester $CO_2$ from flue gases. The flue gases may be generated by gas and oil-fired boilers, combined cycle power plants, coal gasification, and hydrogen and biogas plants.

In one embodiment, a solvent has an amino hindered alcohol with vapor pressure less 0.1 kPa at 25 C and a polyamine with three or more amino groups with vapor pressure less 0.009 kPa at 25 C, and a carbonate buffer to buffer the solvent to a pH greater than 8 (e.g., a pH of about 8, about 10, or about 13). The solvent can have a vapor pressure less than 1.85 kPa at 25 C.

In another embodiment, a polyamine with vapor pressure less than 0.009 kPa at 25 C (e.g., as 2-Piperazine-1-ethylamine or diethylenetriamine) creates resiliency to aerosol phase emissions due to very low pressure, which may result of carbamate reaction with $CO_2$. The amino hindered alcohol with vapor pressure less 0.1 kPa at 25 C will form aerosol phase emissions due to a carbonate/bicarbonate reaction with CO2. In a specific embodiment, a hindered alcohol with a polyamine with low vapor pressure (0.009)

yields less than 32 mg/Nm3 aerosol formation. In a specific embodiment, a hindered alcohol with a polyamine with low vapor pressure (0.009) yields less than 28 mg/Nm3 aerosol formation. In other embodiments, a hindered alcohol with a polyamine with low vapor pressure (0.009) yields more than half of aerosols being less than 32 mg/Nm3. In another embodiment, a hindered alcohol with a polyamine with low vapor pressure (0.009) yields more than half of the aerosols being less than 28 mg/Nm3.

In one example, the solvent may include an aqueous solution of 2-amino-2-methylproponol, 2-Piperazine-1-ethylamine, diethylenetriamine, 2-methylamino-2-methyl-1-propanol, and potassium carbonate. The solvent and method have favorable solvent regeneration (i.e., amount of input energy is low), chemical stability, vapor pressure, total heat consumption, net cyclic capacity, and reaction kinetics. The solvent and method also result in low emission of aerosols and nitrosamines, and substantially no foaming.

In one example, the solvent comprises an amino hindered alcohol having a vapor pressure less than 0.1 kPa at 25 C, a polyamine with three or more amino groups having vapor pressure less 0.009 kPa at 25 C, and a carbonate buffer. The solvent has a vapor pressure less than 1.85 kPa at 25 C. The polyamine can be 2 piperazine-1-ethylamine and diethylenetriamine together, and the amino hindered alcohol can be 2 methylamino-2-methyl-1-propanol, and 2-amino-2-methylproponol together.

For illustration, 2-amino-2-methylproponol and 2 methylamino-2-methyl-1-propanol propanol are sterically hindered alcohols that have low absorption heats, high chemical stabilities, and relatively low reactivity. Piperazine-1-ethylamine and diethylenetriamine have very high, fast kinetics and are chemically stable under the conditions disclosed herein. Piperazine-1-ethylamine and diethylenetriamine have very low volatilities, which reduce environmental concerns of the disclosed solvent. Piperazine-1-ethylamine and diethylenetriamine may act as promoters for 2-amino-2-methylproponol and 2-methylamino-2-methyl-1-propanol to provide high absorption activity and fast reaction kinetics.

The $CO_2$ solvent may contain a carbonate buffer. A pH range for the carbonate buffer may be between about 8.0 and about 13. The presence of the carbonate buffer can increase the pH of the solvent. A pH of about 8.0 to about 9.0 allows for increased $CO_2$ capture in the form of bicarbonate salts. The carbonate buffer may be regenerated when the solvent is heated. For example, percarbonate may be utilized.

Carbonate buffer salts may also be used. The amount of carbonate buffer salt used should be sufficient to raise salivary pH to about 7.8 or more, about 8.5 or more, or about 9 or more (e.g., about 9 to about 11), irrespective of the starting ph. Thus, the amount of carbonate buffer salt used in the solvent will depend upon implementation conditions. In an example, the carbonate buffer salt may be sodium carbonate, potassium carbonate, calcium carbonate, ammonium carbonate, or magnesium carbonate.

Bicarbonate salts may also be used. Exemplary bicarbonate salts include, for example, sodium bicarbonate, potassium bicarbonate, calcium bicarbonate, ammonium bicarbonate, and magnesium bicarbonate.

Binary buffer compositions may additionally be utilized. An exemplary binary buffer composition includes a combination of sodium carbonate and sodium bicarbonate. In an example, the sodium bicarbonate of the solvent may be desiccant-coated sodium bicarbonate.

An amount of carbonate buffer and amine promoter in the solvent may be limited by the solubility of both components in water, resulting in a solid solubility limit for aqueous solutions. For example, at 25 C, the solubility of potassium carbonate buffer in a $CO_2$ rich solution is 3.6 m. With the solid solubility limitation, the resulting lower concentration can result in a slow reaction rate and low solution capacity. By combining piperazine-1-ethylamine, diethylenetriamine, and carbonate buffer, for example, the resultant solubility increases.

When promoter absorbent amines such as Piperazine-1-ethylamine and Diethylenetriamine reach with $CO_2$, an equilibrium reaction occurs to form carbamate and dicarbamate and some free and bound promoter amines. Because of the addition of carbonate buffer salt, which reacts with free and bound promoter amines, the equilibrium reaction is driven to completion, thereby resulting in more $CO_2$ absorption.

In an example, the solvent contains 2-amino-2-methylproponol in an amount of about 10 wt % to about 32 wt %, about 11 wt % to about 28 wt %, and preferably in an amount of about 13 wt % to about 25 wt %. When about 12 vol % $CO_2$ is experienced at the inlet of a flue gas $CO_2$ capture system, about 19.5 wt % of 2-amino-2-methylproponol may be desirable. When about 4 vol % $CO_2$ is experienced at the inlet of a flue gas $CO_2$ capture system, about 13.3 wt % of 2-amino-2-methylproponol may be desirable. When about 40 vol % $CO_2$ is experienced at the inlet of a biogas $CO_2$ capture system, about 24.2 wt % of 2-amino-2-methylproponol may be desirable.

In another example, the solvent contains 2-Piperazine-1-ethylamine in an amount of about 10 wt % to about 35 wt %, about 12 wt % to about 30 wt %, and preferably in an amount of about 14 wt % to about 28 wt %. When about 12 vol % $CO_2$ is experienced at the inlet of a flue gas $CO_2$ capture system, about 22.4 wt % of 2-Piperazine-1-ethylamine may be desirable. When about 4 vol % $CO_2$ is experienced at the inlet of a flue gas $CO_2$ capture system, about 27.6 wt % of 2-Piperazine-1-ethylamine may be desirable. When about 40 vol % $CO_2$ is experienced at the inlet of a biogas $CO_2$ capture system, about 15.15 wt % of 2-Piperazine-1-ethylamine may be desirable.

In a further example, the solvent contains diethylenetriamine in an amount of about 0.1 wt % to about 4 wt %, about 0.1 wt % to about 3 wt %, and preferably in an amount of about 0.1 wt % to about 0.35 wt %. When about 12 vol % $CO_2$ is experienced at the inlet of a flue gas $CO_2$ capture system, about 0.2 wt % of diethylenetriamine may be desirable. When about 4 vol % $CO_2$ is experienced at the inlet of a flue gas $CO_2$ capture system, about 0.35 wt % of Diethylenetriamine may be desirable. When about 40 vol % $CO_2$ is experienced at the inlet of a biogas $CO_2$ capture system, about 0.1 wt % of diethylenetriamine may be desirable.

In yet another example, the solvent contains 2-Methylamino-2-methyl-1-propanol in an amount of about 0.8 wt % to about 5 wt %, about 1 wt % to about 2.8 wt %, and preferably in an amount of about 1.2 wt % to about 1.8 wt %. When about 12 vol % $CO_2$ is experienced at the inlet of a flue gas $CO_2$ capture system, about 1.5 wt % of 2-Methylamino-2-methyl-1-propanol maybe desirable. When about 4 vol % $CO_2$ is experienced at the inlet of a flue gas $CO_2$ capture system, about 1.2 wt % of 2-methylamino-2-methyl-1-propanol may be desirable. When about 40 vol % $CO_2$ is experienced at the inlet of a biogas $CO_2$ capture system, about 1.8 wt % of 2-methylamino-2-methyl-1-propanol may be desirable.

In an additional example, the solvent contains buffer (e.g., potassium carbonate) in an amount of about 0.1 wt % to about 6 wt %, about 0.2 wt % to about 3 wt %, and preferably in an amount of about 0.5 wt % to about 1.0 wt %. When about 12 vol % $CO_2$ is experienced at the inlet of a flue gas $CO_2$ capture system, about 0.5 wt % of potassium carbonate may be desirable. When about 4 vol % $CO_2$ is experienced at the inlet of a flue gas $CO_2$ capture system, about 0.7 wt % of potassium carbonate may be desirable. When about 40 vol % $CO_2$ is experienced at the inlet of a biogas $CO_2$ capture system, about 0.4 wt % of potassium carbonate may be desirable.

Characteristics of the solvent play a major role in determining both equipment size and process energy requirements. In certain circumstances, the following factors can be considered when choosing a solvent:

- Regeneration energy: since the exothermic reactions taking place in the absorber are reversed by addition of heat in a reboiler, a solvent having a low or lower heat of absorption is desirable;
- Cyclic capacity (the difference between $CO_2$ concentration in the solvent leaving the absorber and that leaving the reboiler): a solvent having a high or higher cyclic capacity is desirable since higher cyclic capacities result in a lower reboiler duty, reduced electrical consumption in pumps, and possible downsizing of equipment, which results in lower investment costs;
- Evaporation loss: a solvent has high evaporation loss, a water wash section is needed on top of the absorber. Thus, a solvent having a low evaporation loss is desirable, thereby eliminating the need for a water wash section;
- Solubility in water: amines with bulky non-polar parts showing limited solubility in water. Thus, a solvent having amines soluble in water is desirable;
- Chemical stability: a solvent that is not vulnerable to oxidative degradation is desired. A problem with MEA is its vulnerability towards oxidative degradation when exposed to an exhaust gas;
- Corrosivity: the solvent, as well as its possible degradation products, should exhibit limited corrosivity;
- Foaming: if not controlled, foaming may lead to gas cleaning and mal-distribution of liquid flow in the absorption tower, thus reducing its performance. Accordingly, a solvent exhibiting minimal to no foaming is desirable;
- Toxicity and environment impact: a solvent exhibiting minimal to no toxicity and environmental impact is desirable; and
- Aerosol and nitrosamine emissions: since aerosols and nitrosamine are volatile, a solvent exhibiting minimal to no production of aerosols and nitrosamine is desirable.

Certain exemplary solvents have characteristics with respect to the aforementioned criteria compared to other solvents (e.g., MEA), presently accepted industry standard. These characteristics are exemplified through the below detailed experiments involving MEA as a reference solvent. Certain solvents disclosed herein has low energy requirements and good chemical stability. The method of using the solvent disclosed herein makes use of the solvent's characteristics, resulting in the method having a low energy consumption with minimal environment impact. Other benefits of the disclosed solvent and method will become apparent in light of the description set forth herein.

A variety of container, absorber, or tower devices as known in the art can be used for the contacting step. The size and shape, for example, can be varied. The container can have one or more input ports and one or more exit ports. For example, the contacting step can be carried out in an absorption column. In the contacting step, a gas such as the first composition can be passed through a liquid composition such as the second composition. One can adapt the parameters to achieve a desired percentage of carbon dioxide capture such as, for example, at least 70%, or at least 80%, or at least 90% carbon dioxide capture. Recycling can be carried out where solvent is looped back into a reactor for further processing. In one embodiment, after the contacting step, the second composition with its dissolved carbon dioxide is subjected to one or more carbon dioxide removal steps to form a third composition which is further contacted with a first composition comprising carbon dioxide. Other known processing steps can be carried out. For example, filtering can be carried out. As known in the art, pumps, coolers, and heaters can be used.

A contacting step can be part of a larger process flow with other steps both before and after the contacting step. For example, membrane separation steps can also be carried out as part of the larger process. For example, PBI membranes can be used. The contacting step can be also part of a larger process in which components are removed. In some preferred embodiments, the contacting step is part of a carbon capture process. For example, an IGCC plant and carbon capture are described in in the literature. As known in the art, pre-combustion capture processes and compression cycles can be carried out. Continuous or batch processing can be carried out. The contacting step results in at least partial dissolution of the carbon dioxide of the first composition in the second composition.

EXAMPLES AND EXPERIMENTS

The following examples illustrate methods and embodiments in accordance with the invention.

Screening

In certain examples, a mini-vapor-liquid equilibrium ("VLE") setup was used to test exemplary solvents. The mini-VLE setup included six (6) apparatuses in parallel. The 6 apparatuses were capable of being operated at different temperatures. Different combinations of solvent components and concentrations were screened at 40 C and 120 C. These solvents components screened were 2-amino-2-methylpropanol, 2-Piperazine-1-ethylamine, Diethylenetriamine, 2-Methylamino-2-methyl-1-propanol, potassium carbonate, piperazine, 2-methyl piperazine, N-ethyl ethanolamine, and N-methyl diethanolamine.

VLE Measurements Using Autoclave

VLE measurements demonstrate the relationship between partial pressure of $CO_2$ in the vapor phase and the loading (i.e., concentration) of $CO_2$ in a solvent at different temperatures. An autoclave apparatus used to perform VLE testing is described. The autoclave includes a glass vessel, a stirrer, a pH sensor, and pressure sensors. The volume of the vessel was 1 liter. Prior to commencing the experiment, pressure was brought down to −970 mbar using a vacuum pump. 0.5 liter of solvent was added to the vessel and was heated up so equilibrium could be determined at a constant temperature of the solvent. VLE was determined at several $CO_2$ partial pressures and temperatures.

At the start of the experiment, a $CO_2$ pulse was performed. A subsequent pulse was performed only if the following two conditions were satisfied: (1) the time between two pulses was at least 45 minutes; and (2) the average pressure value of 5 minutes of data did not deviate by more than 1 mbar from the average value of 5 other minutes of data points 15 minutes earlier. The latter condition ensured the subsequent pulse was only given when the pressure was stabilized. The pressure measured in the vessel at t=0 s was subtracted from pressures measured after the CO₂ pulses. At higher temperatures, the vapor pressure of the solvent (measured in a separate experiment) was subtracted from the measured pressures.

Figure 4:
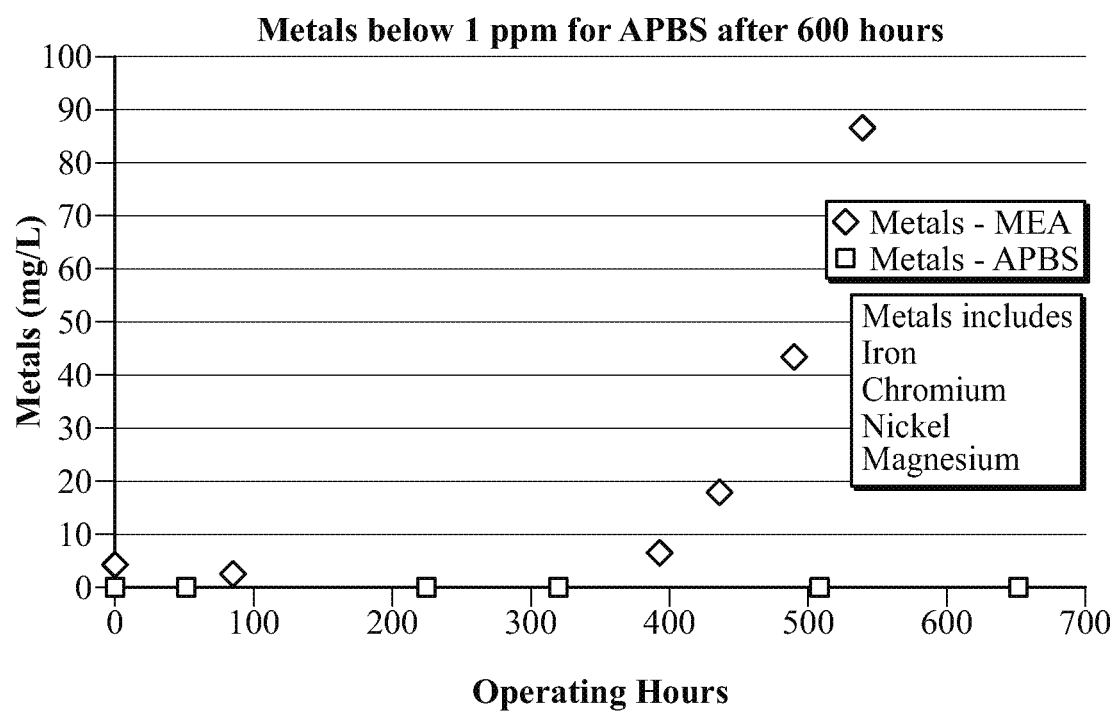
FIG. 4 illustrates corrosion/solvent metal content of MEA (30 wt. %) and APBS according to the present disclosure.
Figure 6:
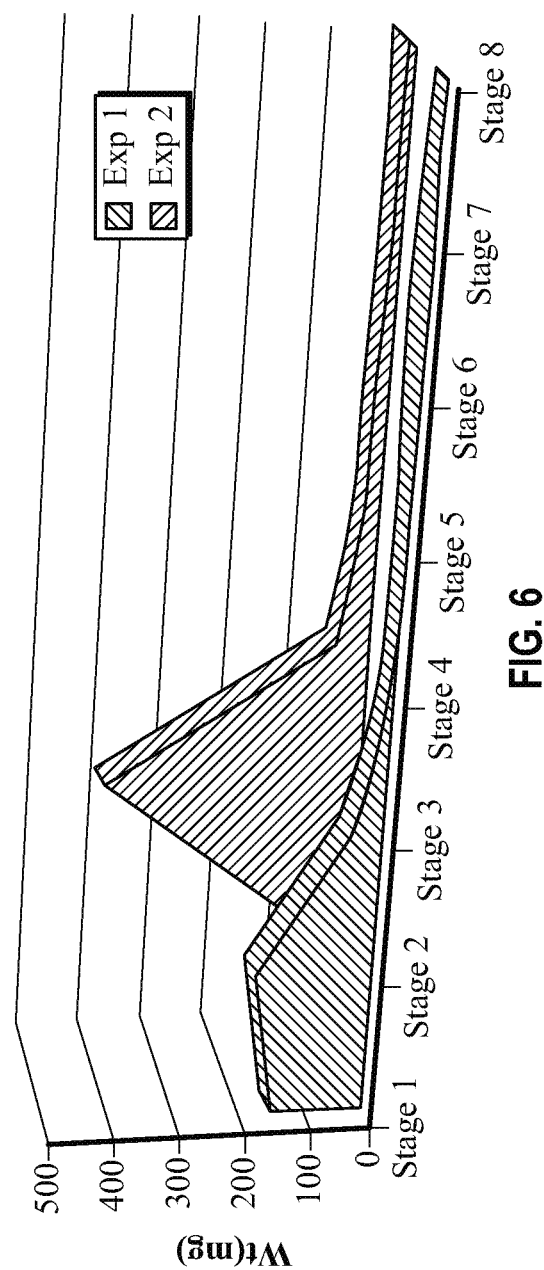
FIG. 6 illustrates an aerosol particle size distribution according to the present disclosure.

FIGS. 4 and 6 show results of the aforementioned VLE testing. The partial pressure of $CO_2$ in the vapor phase increased with temperature for a given $CO_2$ loading in the solvent. The points of interest for a solvent based $CO_2$ capture process are the observed $CO_2$ loading at "rich" and "lean" solvent conditions. "Lean" solvent is the fresh solvent entering the absorber and is ideally free of $CO_2$. "Rich" solvent is the solvent leaving the absorber having absorbed as much $CO_2$ as possible. The two main parameters of a solvent that influence its absorption performance are (a) net cyclic capacity (i.e., the difference of rich and lean loading); and (b) kinetics due to change in the temperature of both lean solvent and flue gas.

Figure 3:
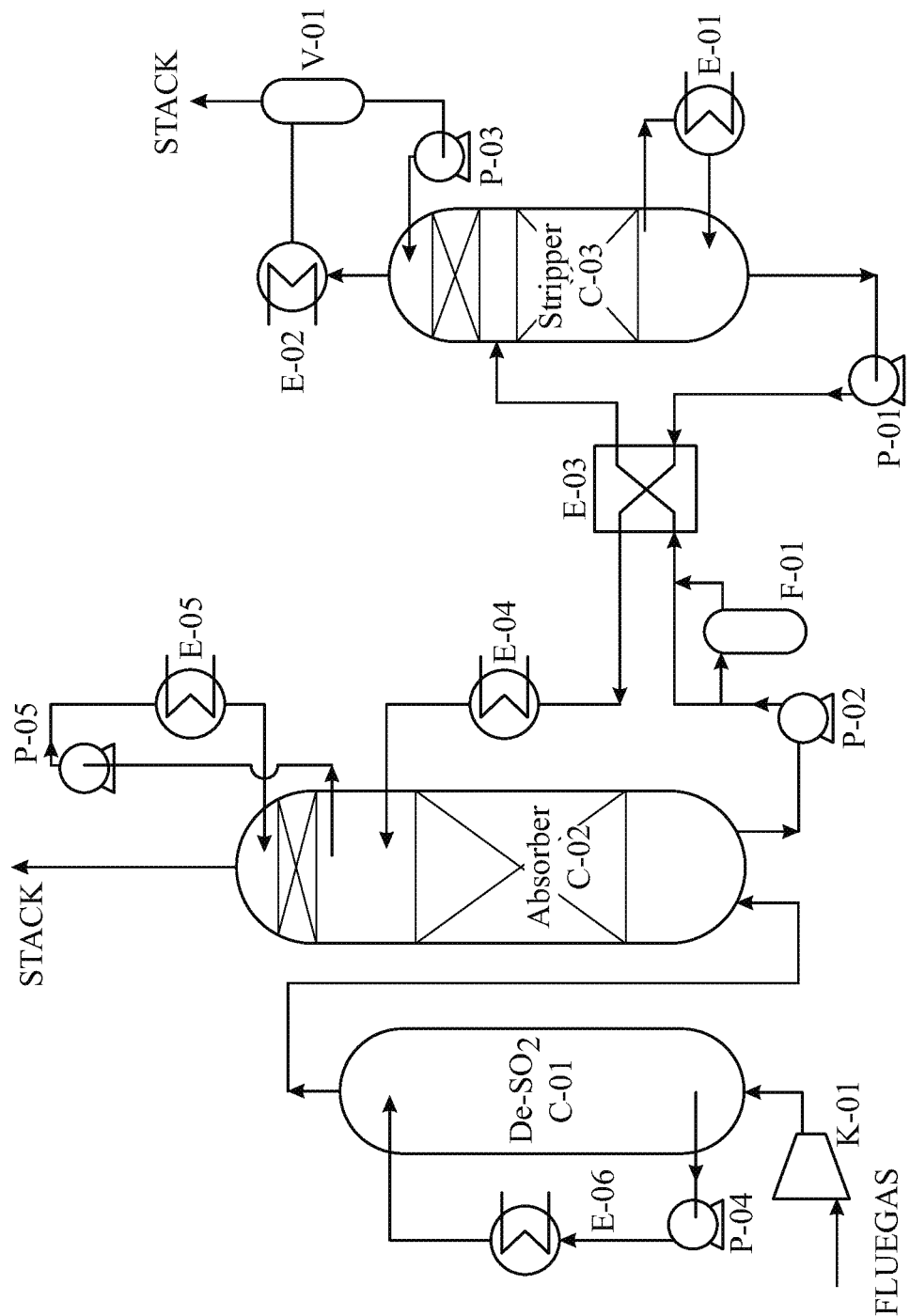
FIG. 3 illustrates a flow-scheme of a carbon capture pilot according to the present disclosure.

As indicated in FIG. 3, the APBS solvent was tested at 40 C and 120 C to determine vapor equilibrium data of the APBS solvent (i.e., $CO_2$ loading (mol/L) versus the partial pressure of $CO_2$ (kPa)). The APBS solvent was screened and optimized based on $CO_2$ vol % at the inlet in resultant flue gases, such as coal (12 vol % $CO_2$)/gas (4 vol % $CO_2$) fired flue gases and biogas (40 vol % $CO_2$). The $CO_2$ loading of the solvent increased as the partial pressure of the $CO_2$ was increased. However, temperature played a role in the magnitude of $CO_2$ loading versus the $CO_2$ partial pressure.

Figure 5:
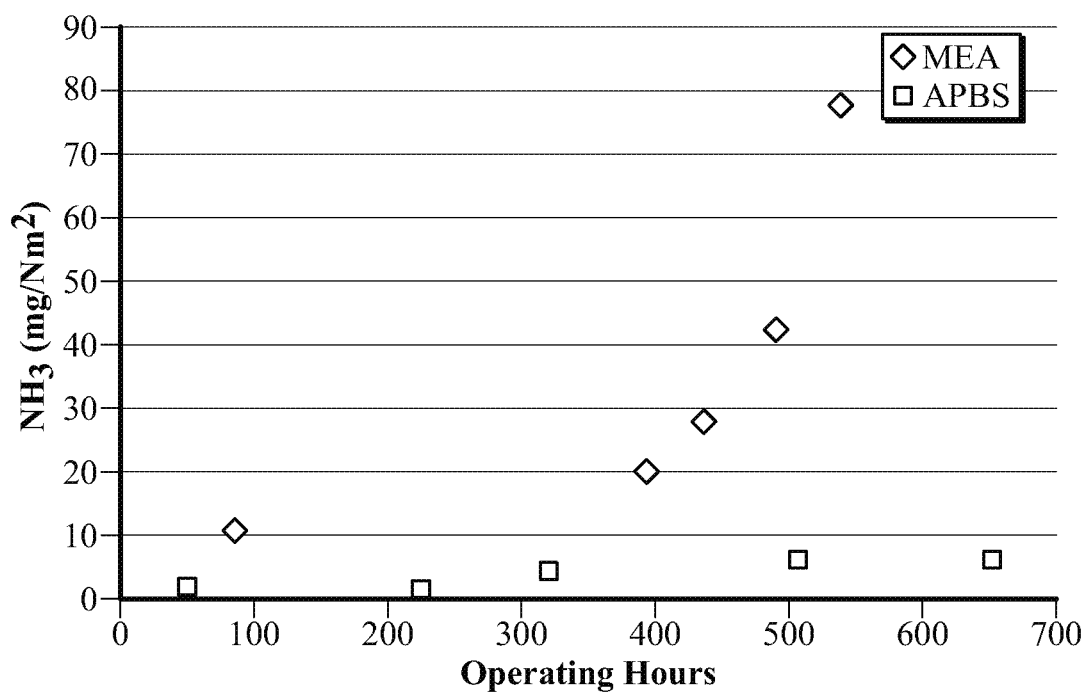
FIG. 5 illustrates ammonia emissions during a pilot plant campaign according to the present disclosure.

FIG. 5 show a comparison of vapor-liquid equilibrium data of the solvent disclosed herein (APBS 12 vol % $CO_2$) versus MEA at different temperatures (i.e., 40 C and 120 C); under absorber and stripper conditions. The points of interest for a solvent based $CO_2$ capture process are the observed $CO_2$ loading at "rich" and "lean" solvent conditions. "Lean" solvent is the fresh solvent entering the absorber and is ideally free of $CO_2$. "Rich" solvent is the solvent leaving the absorber having absorbed as much $CO_2$ as possible. For a typical coal fired plant (12 vol % $CO_2$), the $CO_2$ partial pressure in the exhaust gas stream is about 12 kPa. For a counter current based absorption system, the rich solvent is in contact with this flue gas at the inlet and is defined as the rich loading. Generally, the temperature of the rich solvent is taken to be 40 C. This leads to a rich loading of 3.3 mol/L for 90% $CO_2$ capture. The $CO_2$ partial pressure should not be more than 1 kPa and thus, the lean loading too should not exceed the corresponding value. Based on the VLE measurements, the lean loading of the APBS solvent at $CO_2$ partial pressure of 1 kPa is mol/L. Commercially this data is very important, as difference of rich and lean loading is the amount of $CO_2$ captured. For APBS solvents this difference is twice the benchmark solvent MEA used today, leading to 50% reduction in solvent circulation rates. Lower solvent circulation rates result in lower solvent circulation cycles, lowering overall energy, degradation, and corrosion.

Kinetic Measurement of $CO_2$ Reaction in Aqueous Solvent

Figure 7:
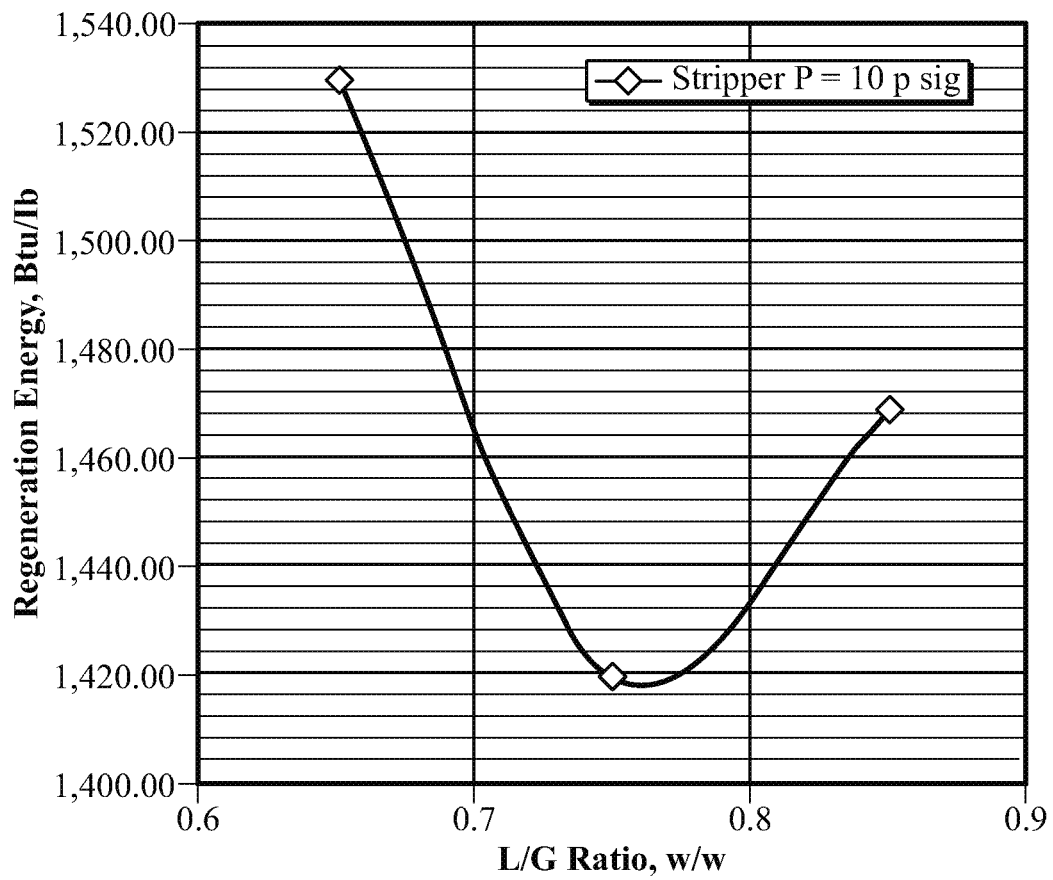
FIG. 7 illustrates the effect of L/G ratios on regeneration efficiency according to the present disclosure.

Referring to FIG. 7, a device used to determine the kinetics of $CO_2$ reacting with aqueous APBS is described. The device includes a glass stirred cell reactor having a plane and a horizontal gas-liquid interface used for obtaining absorption rate measurements. The gas and liquid are stirred separately by impellers. The setup was supplied by two reservoirs (equipped with heat exchangers), one for the gas phase and one for the liquid phase.

The rate of absorption as a function of $CO_2$ partial pressure at various temperatures using the device of FIG. 7 are represented in Table 1 below.

TABLE 1

Rate of absorption as a function of $CO_2$ partial pressure at various temperatures.

| Temperature (C.) | Pc02 (kPa) | APBS (Rc02 × 106) (kmol/(m²sec)) |
|---|---|---|
| 40 | 5.4 | 12.5 |
| 50 | 8.1 | 24.4 |
| 60 | 7.28 | 30.4 |

Energy and Reboiler Duty Comparison for MEA and APES/ the Solvent

For the $CO_2$ to be transferred from the liquid phase to the gas phase, there needs to be a driving force on the basis of partial pressure. Steam provides this driving force, resulting in the mass transfer of $CO_2$ from the liquid phase to the gas phase being enhanced. This also has energy associated with it, which contributes to the overall reboiler duty. By finding out the amount of water associated with the pure $CO_2$ steam produced (this energy being in the form of water lost that needs to be provided by the reboiler), the amount of energy associated with mass transfer of $CO_2$ from the liquid phase to the gas phase can be determined. The total amount of energy/heat needed to transfer $CO_2$ from the liquid phase to the gas phase is represented by $$Q_T = Q_{sens} + Q_{des} + Q_{strip} \quad \text{Equation 8}$$

A solvent loaded with $CO_2$ in the absorber may be heated up to stripper temperature for the regeneration of $CO_2$. A solvent stream can be pre-heated in the lean-rich cross heat exchanger and then additional heat may be used to maintain the temperature of a solvent in the stripper (represented by Equation 9).

$$Q_{sens} = \frac{\delta C_P \Delta T}{(\alpha_{rich} - \alpha_{lean})C_{amine}} \quad \text{Equation 9}$$

Contributing factors to sensible heat are solvent flow, specific heat capacity of a solvent, and the temperature increase. Thus, the parameter that can be varied is one solvent flow, which further depends on the concentration of one solvent and the one solvent's loadings. This can be decreased by circulating less solvent and maintaining the same $CO_2$ production rate. This is checked by means of comparing the net capacity of a solvent, which is defined as the difference in the loading at absorption and desorption conditions.

The $CO_2$ which is reversibly bound to a solvent needs to be regenerated. The heat of desorption (Q<les) is equivalent to the heat of absorption. The stripping heat is represented by Equation 10.

$$Q_{strip} = \frac{P^{sat}_{H2O}(T_{top,des}) \chi_{H2O,freebasis}}{P^*_{CO2}(T_{top,des} \cdot \alpha_{rich})} \Delta H^{vap}_{H2O} \quad \text{Equation 10}$$

$\Delta H_{H2O}^{vap}$ is the heat of vaporization of water and $P^*_{CO2}$ 1s the partial pressure of $CO_2$ at equilibrium with the rich solution at the bottom of the absorber.

Table 2 below shows a comparison of the reboiler duty in a typical $CO_2$ capture plant based on 5 M MEA and APBS 12 vol % $CO_2$ solvent. The total heat requirement in terms of reboiler duty was 2.3 GJ/ton $CO_2$ for the APBS solvent, which is about 30.5% lower than that of MEA (i.e., 3.31 GJ/ton CO2).

TABLE 2

Comparison of the reboiler duty in a typical $CO_2$ capture plant based on 5M MEA and the APBS 12 vol % solvent.

|  |  | APBS 12 vol % | 5M MEA |
|---|---|---|---|
| Qsens | kJ/kg CO2 | 140 | 517 |
| Qdes |  | 1539 | 1864 |
| Qstrip |  | 555 | 924.5 |
| QT | GJ/ton CO2 | 2.3 | 3.31 |

Figure 8:
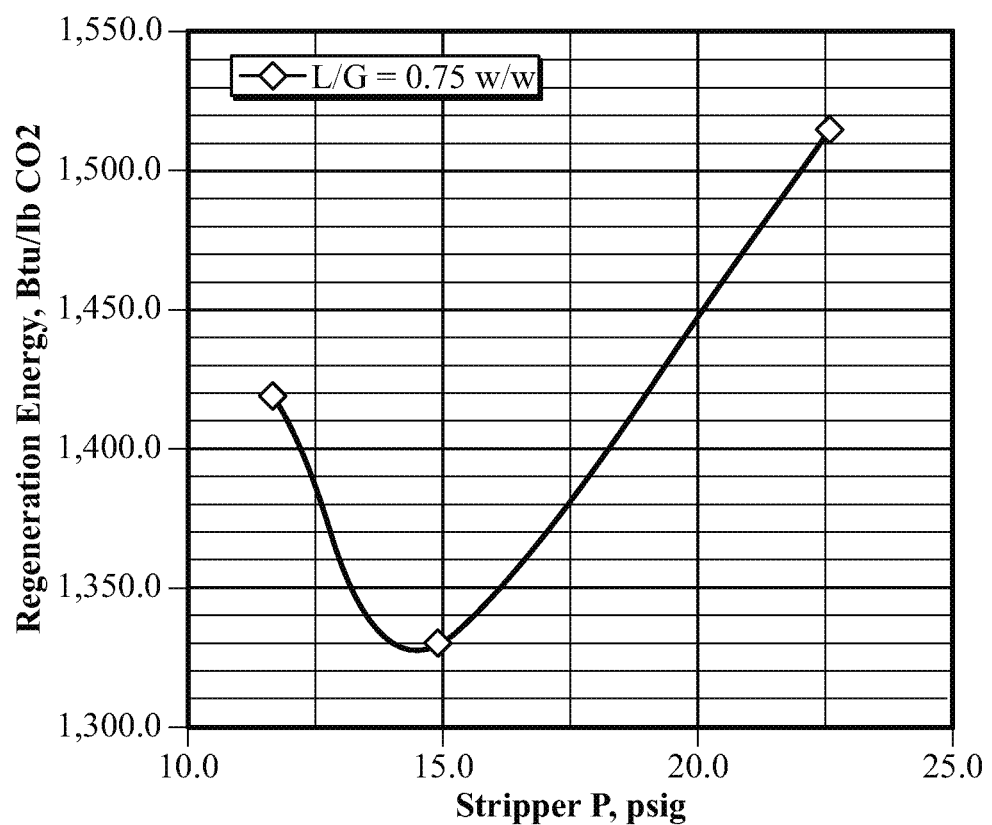
FIG. 8 illustrates the effect of stripper pressure on regeneration efficiency according to the present disclosure.

Pilot Plant Testing—E.ON $CO_2$ Capture Pilot—Netherlands (6 Tons/Day $CO_2$ Capture The APBS 12 vol % solvent test campaign was conducted at the E.ON $CO_2$ capture plant in Maasvlakte, Netherlands. The $CO_2$ capture plant receives flue gas from unit 2 of the E.ON coal based power station. The capture plant can capture 1210 $Nm^3/h$ of flue gas. A schematic representation of the capture plant is depicted in FIG. 8. Table 3 below is a legend for the FIG. 3 schematics and Table 4 provides the main parameters of the columns of the E.ON $CO_2$ capture plant.

TABLE 3

Legend of FIG. 8 $CO_2$ capture plant schematics.

| C-01 | SO2-scrubber | E-01 | Reboiler | P-01 | Lean solvent pump |
|---|---|---|---|---|---|
|  |  | E-02 | Condenser | P-02 | Rich solvent pump |
| C-02 | Absorber | E-03 | Lean-rich HX | P-03 | Condensate pump |
| C-03 | Stripper | E-04 | Lean solvent cooler | P-04 | Scrubber pump |
| F-01 | Filter unit |  |  | P-05 | Wash section pump |
| V-01 | Condensate drum | E-05 | Wash section cooler | K-01 | Flue gas fan |
|  |  | E-06 | Scrubber cooler |  |  |

TABLE 4

Main parameters of the E.ON capture plant columns.

|  | SO2 scrubber | Absorber | Stripper |
|---|---|---|---|
| Packing height (m) | 3 (1 bed) | 8 (4 × 2 m) | 8 (2 × 4 m) |
| Diameter (m) | 0.7 | 0.65 | 0.45 |
| Washing Section (m) | — | 2 | 1.1 |
| Packing | IMTP 50 | IMTP 50 | IMTP 50 |
| Demister | — | Yorkmesh 172 | Yorkmesh 172 |

Degradation of Unci Corrosion Caused by the APBS Solvent

Table 3. Legend of FIG. 8 $CO_2$ capture plant schematics.

TABLE 4

Main parameters of the E.ON capture plant columns.

|  | SO2 scrubber | Absorber | Stripper |
|---|---|---|---|
| Packing height (m) | 3 (1 bed) | 8 (4 × 2 m) | 8 (2 × 4 m) |
| Diameter (m) | 0.7 | 0.65 | 0.45 |
| Washing Section (m) | — | 2 | 1.1 |
| Packing | IMTP 50 | IMTP 50 | IMTP 50 |
| Demister | — | Yorkmesh 172 | Yorkmesh 172 |

Degradation of and Corrosion Caused by the APES Solvent

Degradation of solvent often occurs either thermally or due to oxidation in the flue gas. The oxygen content of flue gas from a typical coal fired power plant is about 6% to about 7% by volume. Thermal solvent degradation typically occurs in hot zones such as in the stripper. However, the extent of thermal degradation is lower than oxidative degradation. Degradation of the solvent leads to loss in active component concentration, corrosion of the equipment by the degradation products formed, and ammonia emissions.

Figure 9:
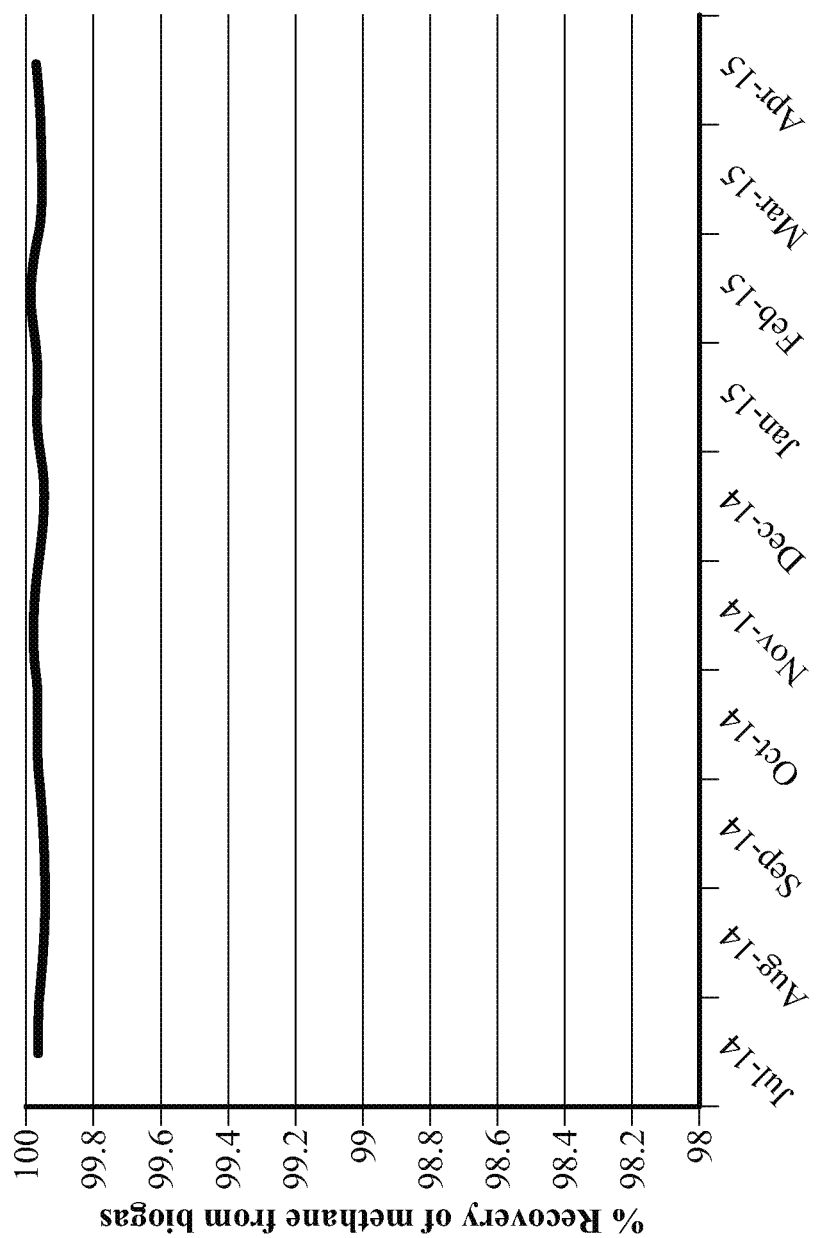
FIG. 9 illustrates methane recovery using a solvent according to the present disclosure.

Degradation can be observed visually as shown in FIG. 9, which contains pictures of MEA and the APBS solvent over the duration of a campaign lasting 1000 operating hours. The color of degraded MEA solution is almost black while the color of degraded APBS seems to be largely unchanged from the start of the test campaign to the end. This indicates that APBS has higher resistance to degradation than MEA. Also, the APBS solvent exhibits zero foaming tendency and a high resistivity towards $SO_2$ in the flue gas.

As mentioned above, degradation of solvent leads to corrosion of the equipment of $CO_2$ capture systems. Typically, most of the equipment in contact with the solvent is stainless steel. Thus, based on the amount of metals such as Fe, Cr, Ni, and Mn dissolved in the solvent, it is possible to estimate the extent of internal plant corrosion. FIG. 4 shows the metal content of APB S and MEA during the pilot plant campaign. The metal content of APBS remained below 1 mg/L, even after 1000 operation hours. By comparison, during a previous MEA campaign at the same pilot plant, metal content of MEA was about 80 mg/L within 600 operating hours. Since the metal content of a solvent is correlated with the amount of equipment corrosion caused by the solvent, this comparison of APBS and MEA demonstrates that APBS causes less corrosion of equipment than MEA (which is known by those skilled in the art to degrade rapidly, leading to severe corrosion).

Ammonia ($NH_3$) is a degradation product of $CO_2$ capture solvents. Ammonia, since it is volatile, may only be emitted into the atmosphere in small quantities with $CO_2$ free flue gas. Consequently, monitoring and minimization of ammonia emission levels is essential. FIG. 5 illustrates measured ammonia emission levels of MEA and APBS during the pilot/campaign at the E.ON $CO_2$ capture plant. For most of the campaign, ammonia emission levels of the APBS solvent were below 10 $mg/Nm^3$. This is in stark contrast to the ammonia emission levels of the MEA solvent, which ranged from about 10 $mg/Nm^3$ to about 80 $mg/Nm^3$. Accordingly, APBS is a safer solvent than MEA regarding production and emission of ammonia due to degradation.

Aerosol of APES Solvent Using Impactor and Impingers

The aerosol box has been installed at a sampling point above the water wash section of the pilot plant. From preliminary tests it has been decided to raise the temperature in the aerosol box 1.5 C above the temperature monitored in the sorption tower and at the measurement location, It takes some time for the conditions in the pilot plant to stabilize as the internal temperature of the aerosol box very fast in order to condition the Anderson cascade impactor. The duration of the first measurement was for 63 min. The second measurement was of atlost equal duration (66 min). At the end of 66 min, the impinger sampling was continued. In the first measurement the temperature at the sample location varied between 39.94 and 41.05 C, while the temperature in the aerosol measurement box varies between 40.8 and 42.2 C. In the second measurement the temperature at the sample location varies between 39.7 and 41.4 C and the aerosol bix temperature between 40.7 and 42.2 C. Samples from aerosol trapped from the 28.3 L/min flow through the impactor stages and collected by adding 5 mL of water to vials with each one of the filter papers. After shaking the vials, the 8 liquid volumes are added for further analysis by LC-MS.

Table 10 shows the results from the solvent components polyamine and the ammo hindered alcohol from impactor (aerosol) droplets and impingers (vapor). As per the results of experiment 1, most of the amines are found from the impactor. The absolute amount of 2-Piperazine-1-ethylamine is as expected. Moreover the ratio of 2-amino-2-methylproponol and 2-Piperazine-1-ethylamine is as expected. The results from experiments 2 indicate that more amount of amines is present in the impingers rather than the impactor.

This is due to the fact that the second hour of the sampling included both aerosols and vapor based emissions. Thus, most of the contribution in the impingers is due to the aerosol component.

The concentration of amines in the droplets collected by the impactor is about 3 wt. %. Thus, most of content of the droplets is water. This is quite low as compared to MEA aerosols, whose concentration in the droplets is greater than 50 wt. %. from experiments performed at the pilot plant using a similar method.

The aerosol box separates particles into one of eight stages with a particle distribution from 0.43 mm to 11 mm. Stage 1 contains the biggest particles, stage 8 contains the smallest particles. In the first measurement, most aerosol particles were collected on the top three stages with a maximum near 5.8 mm to 9 mm. In the second measurement, most aerosol particles were collected on the top four stages with a maximum near 4.7 mm to 5.8 mm. The total weight collected from all the stages was 421 mg and 690 mg for the first and second experiments, respectively. The corresponding aerosol concentration was 271 mg/Nm$^3$ and 423 mg/Nm$^3$ for first and second measurements, respectively. The aerosol particle size distribution over the eight stages for both measurements is given in FIG. 6. Overall, this demonstrates that APBS is more resilient to aerosol production/formation than MEA.

Nitrosamine Emissions of APES Solvent Using Impactor and Impingers

Nitrosamines are known to be carcinogenic. However, nitrosamines are also present in the environment. Thus, it is important to quantify the extent of nitrosamines accumulated in the solvent and emitted to the atmosphere. Primarily, secondary amines form nitrosamines on reaction with NO$_{-3}$ accumulated in the solvent from the flue gas. However, it is a very tedious task to list all the specific nitrosamines. Thus, only the total nitrosamines in the form of the functional group "NNO". Table 8, the nitrosamine content of the first impinge was below the measured threshold, i.e <15 ug/kg, the content for the second impinge is 15 ug/kg. A total of <15 ug/kg*0.1 kg+15 ug/kg*0.1 kg is less than 3 ug total nitrosamines in the 66+60 min duration of the experiment. The resulting nitrosamine concentration in the vapor phase at the sample location is <4.4 ug/Nm3.

TABLE 5

Resiliency of APBS as compared to MEA regarding aerosol solvent emissions.

| Exp. | Exposure | Instrument | 2-amino-2-methylproponol (mg/Nm3) | 2-Piperazine-1-ethylamine (mg/Nm$^3$) |
|---|---|---|---|---|
| 1 | 63 min aerosol droplets | Impactor | 16.4 | 5.6 |
| | 63 min vapor | Impinger | <3 | <3 |
| | Total | | 19.4 (max) | 8.6 (max) |
| 2 | 66 min aerosol | Impactor | 8.5 | 2.5 |
| | 66 min vapor + 60 min aerosol droplets and vapor | Impingers | 10 | 11 |
| | Total | | 18.5 | 13.5 |
| | | | MEA (mg/Nm3) | |
| 3 | Aerosol | Impactor | 1580 | |
| | Vapor | Impinger | 6.8 | |
| | Total | | 1587 | |

TABLE 6

Nitrosamine content in samples from two impingers placed in series.

| Exp | Exposure | Instrument | Total Nitrosamine (ug/Nm$^3$) |
|---|---|---|---|
| 1 | 66 min aerosol | Impactor | — |
| | 66 min vapor + 60 min aerosol droplets and vapor | First Impinger | <2.2 |
| | 66 min vapor + 60 min aerosol droplets and vapor | Second Impinger | 2.2 |

Pilot Testing—Us-Doe's National Carbon Capture Center (NCCC)—4 Vol % CO$_2$ Flue Gas The APBS 4 vol % solvent test campaign was conducted at US-DOE's NCCC CO$_2$ capture pilot plant at the Southern Company in Alabama. The APBS solvent was specifically developed to capture 3-6 vol % CO$_2$ from flue gas emissions gas-based power generations.

Apes Testing: 4 Vol % $CO_2$ NCCC $CO_2$ Capture Pilot Plant

The APBS testing was conducted from March 2014 to April 2014 and February 2015 to March 2015 for detailed parametric testing and baseline using state of the art MEA solvent. Table 7 below details a summary of the test data collected from the NCCC pilot testing. All of the testing involved the following conditions:
(1) APBS solvent;
(2) Wash water flow=10,000 lb/hr;
(3) Wash water section exit gas temperature=110 F;
(4) Three stages of packing (119 was packed with 2 beds);
(5) No inter-stage cooling; and
(6) Steam at 35 psi and 268 F (enthalpy=927 Btu/lb).

TABLE 7

Summary of test data from PSTU at NCCC (all runs with 4.3% $CO_2$ wet).

| No. | Run Date | Strip P, psig | Gas Flow, lb/hr | Liquid Flow, lb/hr | L/G, w/w | $CO_2$ eff., % | $CO_2$ Abs., lb/hr | Steam, lb/hr | Steam/ $CO_2$, lb/lb | Energy, Btu/lb $CO_2$ |
|---|---|---|---|---|---|---|---|---|---|---|
| J3 | May 1, 2014 | 9.8 | 8,000 | 5,200 | 0.65 | 85.5 | 439.8 | 718.9 | 1.63 | 1,529.9 |
| J4 | May 1, 2014 | 10.3 | 8,000 | 6,000 | 0.75 | 88.9 | 496.0 | 754.2 | 1.52 | 1,419.5 |
| J5 | May 1, 2014 | 10.0 | 8,000 | 6,800 | 0.85 | 88.9 | 458.9 | 721.3 | 1.57 | 1,469.3 |
| J6 | May 2, 2014 | 12.8 | 8,000 | 5,200 | 0.65 | 91.4 | 468.2 | 713.2 | 1.52 | 1,414.3 |
| 17 | May 3, 2014 | 18.3 | 8,000 | 5,200 | 0.65 | 90.9 | 466.2 | 743.6 | 1.59 | 1,472.1 |
| J8 | May 5, 2014 | 23.1 | 8,000 | 5,200 | 0.65 | 89.3 | 458.4 | 743.2 | 1.62 | 1,488.1 |
| J9 | May 7, 2014 | 11.7 | 8,000 | 6,000 | 0.75 | 90.5 | 464.5 | 719.5 | 1.55 | 1,442.8 |
| J10 | May 8, 2014 | 11.7 | 8,000 | 6,000 | 0.75 | 89.0 | 457.3 | 727.1 | 1.59 | 1,480.1 |
| J11 | May 8, 2014 | 11.7 | 8,000 | 6,000 | 0.75 | 90.7 | 464.9 | 729.3 | 1.57 | 1,460.1 |
| J12 | May 10, 2014 | 14.7 | 8,000 | 6,000 | 0.75 | 90.7 | 463.2 | 671.9 | 1.45 | 1,346.8 |
| J13 | May 11, 2014 | 14.9 | 8,000 | 6,000 | 0.75 | 90.5 | 464.9 | 670.1 | 1.44 | 1,337.1 |
| J14 | May 12, 2014 | 14.7 | 8,000 | 6,000 | 0.75 | 91.9 | 470.7 | 696.2 | 1.48 | 1,372.1 |
| J15 | May 13, 2014 | 14.7 | 8,000 | 6,000 | 0.75 | 92.5 | 475.6 | 682.3 | 1.43 | 1,330.9 |
| J16 | May 13, 2014 | 22.6 | 8,000 | 6,000 | 0.75 | 89.5 | 458.6 | 716.6 | 1.56 | 1,437.7 |
| J19 | May 15, 2014 | 22.6 | 8,000 | 6,000 | 0.75 | 90.4 | 463.6 | 763.8 | 1.64 | 1,515.1 |

Effect of L/G Ratio

The stripper pressure was held constant at 10 psig for runs J3 to 15. The regeneration energy goes through a minima at L/G=0.75 w/w (or 6,000 lb/hr liquid flow for 8,000 lb/hr of gas flow). The "smooth curve" minima was at L/G ratio of about 0.76 (w/w) and about 1,416 Btu/lb. Table 8 below details the data plotted in FIG. 7.

TABLE 8

Data plotted in FIG. 7.

| No. | Run Date | Strip P, psig | Gas Flow, lb/hr | Liquid Flow, lb/hr | L/G, w/w | CO2 eff., % | CO2 Abs., lb/hr | Steam, lb/hr | Steam/ CO2, lb/lb | Energy, Btu/lb CO2 |
|---|---|---|---|---|---|---|---|---|---|---|
| J3 | May 1, 2014 | 9.8 | 8,000 | 5,200 | 0.65 | 85.5 | 439.8 | 718.9 | 1.63 | 1,529.9 |
| 14 | May 1, 2014 | 10.3 | 8,000 | 6,000 | 0.75 | 88.9 | 496.0 | 754.2 | 1.52 | 1,419.5 |
| 15 | May 1, 2014 | 10.0 | 8,000 | 6,800 | 0.85 | 88.9 | 458.9 | 721.3 | 1.57 | 1,469.3 |

Effect of Stripper Pressure

The effect of the stripper pressure on regeneration efficiency is shown in FIG. 8. The L/G ratio was held constant at 0.75 w/w. The regeneration energy goes through sharp minima at stripper pressure close to 15 psig. The "smooth curve" minima is at stripper pressure of about 14 psig and 1,325 Btu/lb $CO_2$. Table 9 below details the data plotted in FIG. 8.

TABLE 9

Data plotted in FIG. 8.

| No. | Run Date | Strip P, psig | Gas Flow, lb/hr | Liquid Flow, lb/hr | L/G, w/w | $CO_2$ eff., % | $CO_2$ Abs., lb/hr | Steam, lb/hr | Steam/ $CO_2$, lb/lb | Energy, Btu/lb $CO_2$ |
|---|---|---|---|---|---|---|---|---|---|---|
| 19 | May 7, 2014 | 11.7 | 8,000 | 6,000 | 0.75 | 90.5 | 464.5 | 719.5 | 1.55 | 1,442.8 |
| J15 | May 13, 2014 | 14.7 | 8,000 | 6,000 | 0.75 | 92.5 | 475.6 | 682.3 | 1.43 | 1,330.9 |
| 119 | May 15, 2014 | 22.6 | 8,000 | 6,000 | 0.75 | 90.4 | 463.6 | 763.8 | 1.64 | 1,515.1 |

Optimal L/G Ratio and Stripper Pressure

The $CO_2$ absorption efficiency for Run 115 (illustrated in Table 8) was 92.5%, which had the minimum energy of regeneration. This shows that the regeneration energy for the conditions of Run 115, but for $CO_2$ removal efficiency of 90%, would have been about 1,290 Btu/lb $CO_2$ (or GJ/ton $CO_2$). From the plots in FIGS. 7 and 8, a global minimum value below 1,250 Btu/lb (2.9 GJ/ton $CO_2$) should be obtained to achieve 90% $CO_2$ capture at NCCC with G=8,000 lb/hr, L/G ratio of 0.76 (or L=6,080 lb/hr), and a stripper pressure of 14.5 psig.

Effect of Inter-Cooling

Runs JI6 and JI7 were performed under the same conditions, except run JI7 was carried out with inter-cooling. The regeneration energy reduced only slightly (less than 0.3%) to 1,434.4 Btu/lb $CO_2$ with the use of inter-cooling, suggesting that inter-cooling may not be effective in reducing the regeneration energy for 4 vol % $CO_2$ flue gas.

Effect of Number of Packed Beds

Runs JI6 and JI9 were performed under the same conditions, except run JI9 was carried out 2 beds. The regeneration energy increased to 1,515.1 Btu/lb $CO_2$ with the use of 2 beds, but the $CO_2$ removal efficiency was slightly higher at 90.4% (as against 89.5% for run 116). This shows that the APBS solvent of the present disclosure was capable of removing 90% $CO_2$ with two packed beds (of 6 meter or 20' packing in PTSU) with about 5% more regeneration energy as compared to that required with 3 beds.

Expected Minimum Energy Consumption

The projected regeneration energy for 90% $CO_2$ capture (1,290 Btu/lb $CO_2$ or 3.0 GJ/ton $CO_2$) using the solvent of the present disclosure is 35% to 40% lower than the values reported for MEA for gas-fired boiler flue gas. However, this is not the lowest achievable value for the APBS solvent. The PSTU was designed for operation using 30% MEA with the flexibility to accommodate other solvents, but the NCCC lean/rich heat exchanger was not designed for the higher viscosity of the APBS solvent relative to 30% MEA. Thus, the measured approach temperatures during the APBS solvent test were higher than those for MEA leading to less than optimal heat recovery.

Simulations with g-PROMs have predicted that with an optimal lean/rich heat exchanger and an advanced stripper design, the minimum regeneration energy of 1,200 Btu/lb $CO_2$ (2.8 GJ/ton $CO_2$) can be achieved for $CO_2$ removal of 90% under the following conditions:

(1) Flue gas with 4.3 vol % $CO_2$ and 16 vol % $O_2$ (G=8,000 lb/hr at PSTU);
(2) Absorber gas velocity=9 ft/sec (PSTU absorber diameter=2', Area=3.142 ft$^2$
(3) L/G ratio of 0.76 w/w (or L=6,080 lb/hr at PSTU); and
(4) Stripper pressure=14.5 psig.

Effect of Oxygen: Ammonia Emissions (16 Vol % $O_2$)

Table 10 illustrates ammonia ($NH_3$) emissions measured in the vapor stream at the wash water outlet in the PSTU at NCCC for a flue gas with 4.3 vol % $CO_2$ and 16 vol % $O_2$ (simulating a natural gas fired boiler). As can be extrapolated, the average ammonia emissions were 3.22 ppm. The $NH_3$ emissions measured at the PSTU while treating a flue gas with 11.4 vol % $CO_2$ and 8 vol % $O_2$ (from coal-fired boiler) with MEA as the solvent were 53.7 ppm. This is almost 17 times higher than the average for APBS solvent (3.22 ppm), which was measured with almost twice the amount of $O_2$ in the flue gas.

TABLE 10

Ammonia emissions with APBS solvent (4.3 vol % $CO_2$, 16 vol % $O_2$).

| Wash Water Outlet | Vapor 1 | Vapor 2 | Vapor 3 |
|---|---|---|---|
| $NH_3$ emissions, ppm | 2.84 | 3.07 | 3.75 |

Dissolved Metals Concentrations

During tests, samples were taken for fresh solvent at the beginning of the test runs and from spent solvent at the end of the test runs. Similar tests were carried out for MEA runs in 2013. A comparison of the results of the APBS solvent and MEA tests is depicted in Table 11.

TABLE 11

Metal concentrations in solvents before and after the test runs (ppb wt).

| Metal | Fresh MEA | Fresh APBS | Rich MEAb | Rich APBSb | RCRA Limit |
|---|---|---|---|---|---|
| Arsenic | <12 | 53.2 | 219 | 114 | 5,000 |
| Barium | <12 | <10 | 265 | 11.8 | 100,000 |
| Cadmium | <12 | <5 | <10 | <5 | 1,000 |
| Chromium | <12 | 42.2 | 45,090 | 2,120 | 5,000 |
| Selenium | 44.1 | 41.8 | 1,950 | 660 | 1,000 |

As can be seen, the level of chromium for MEA was more than 22 times that in the APBS solvent, after two months of testing. This indicates that MEA is much more corrosive than the APBS solvent.

NCCC has concluded that the major source of selenium may be the flue gas. The inlet flue gas with APBS solvent testing was not sampled for selenium or other metals. However, since the coal used at the Gaston power plant was from the same source, the metals level in the flue gas would not have changed significantly from MEA tests in 2013 to those for APBS in 2014. The level of selenium is three times higher in the MEA sample at the end of the runs, and this level (1,950 ppb wt) is almost twice of the RCRA limit of 1,000 mg/L (which is the same as ppb wt for a liquid with specific gravity of 1.0).

CO2 Purity

The $CO_2$ stream after the condenser was analyzed and it was found to be consistently higher than 97 vol % in $CO_2$ with about 2.5 vol % water vapor and 210 ppm $N_2$.

APES Emissions Testing

An analysis of amines and degradation products in the gas leaving the water wash was conducted. The results are summarized in Tables 12 and 13 below.

TABLE 12

Analysis of non-condensed vapor at wash tower outlet (May 2015).

| Compounds Analyzed | Run Identification | | |
|---|---|---|---|
| | CCS-WTO-7 | CCS-WTO-9 | CCS-WTO-10 |
| | All values in ppm wt | | |
| Sum of nitrsoamines in Thermosorb N tube, | 0.0 | 0.0 | 0.0 |
| Sum of amines on sorbent tube SKC 226-30-18 | 2.62 | 9.75 | 2.60 |
| Sum of aldehydes on sorbent tube SKC 226-119 | 1.46 | 1.70 | 1.48 |
| Total hydrocarbons on sorbent tube SKC 226-01 (as C6H6) | 1.95 | 3.15 | 3.13 |

TABLE 13

Details of compounds analyzed for data in Table 11 (May 2015).

| | Run Identification | | |
|---|---|---|---|
| | CCS-WTO-7 | CCS-WTO-9 | CCS-WTO-10 |
| Aldehyde Profile on sorbent tube SKC 226-119 (rotameter #1); Detection Limit 0.5 µg | | | |
| Acetaldehyde, Total µg | 22.7 | 36.3 | 1.23 |
| Acrolein, Total µg | BDL | BDL | BDL |
| Butyraldehyde, Total µg | 3.46 | 12.1 | 0.482 |
| Formaldehyde, Total µg | 1.08 | 1.11 | 0.974 |
| Glutaraldehyde, Total µg | BDL | BDL | BDL |
| Isovaleraldehyde, Total µg | BDL | BDL | BDL |
| Total Hydrocarbons on sorbent tube SKC 226-01 (rotameter #4); Detection Limit 1.0 µg | | | |
| Total Hydrocarbons as Hexane, Total µg | 52.5 | 88.7 | 81.7 |
| Amine Profile on sorbent tube SKC 226-30-18 (rotameter #5); Detection Limit 1.0 µg | | | |
| Allylamine, Total µg | BDL | BDL | BDL |
| Butylamine, Total µg | BDL | BDL | BDL |
| Dibutylamine, Total µg | BDL | BDL | BDL |
| Diethanolamine, Total µg | BDL | BDL | BDL |
| Diethylenetriamine, Total µg | BDL | BDL | BDL |
| Dimethylamine, Total µg | BDL | BDL | BDL |
| Ethanolamine, Total µg | 31.5 | 125 | 31.4 |
| Ethylamine, Total µg | BDL | 1.78 | BDL |
| Ethylenediamine, Total µg | BDL | 1.45 | BDL |
| Isopropylamine, Total µg | BDL | BDL | BDL |
| Methylamine, Total µg | 3.68 | 2.85 | 1.16 |

APES Nitrosamines Testing

Detailed Nitrosamine APBS solvent testing was performed. In all three samples tested (CCS-WTO-7, CCS-WTO-8 and CCS-WTO-10), the values of N-Nitroso-diethanolamine and a series of nitrosoamines were below detection limits of the two methods used. The results are summarized in Tables 14 and 15 below.

TABLE 14

Test for N-Nitrosodiethanolamine by OSHA Method 31-Modified (April 2015).

| Sample ID | Detection Limit (ug/tube) | Concentration (ug/tube) |
|---|---|---|
| CCS-WTO-7, -9 and -10 | 0.04 | <0.04 |

TABLE 15

Results for Nitrosamines by NIOSH 2522-Modified (April, 2015).

| Sample ID | Analyte | Detection Limit (ug/tube) | (ug/tube) |
|---|---|---|---|
| CCS-WTO-7, -9 and -IO | N-Nitrosodimethylamine | 0.02 | <0.02 |
| CCS-WTO-7, -9 and -IO | N-Nitrosomethylethylamine | 0.02 | <0.02 |
| CCS-WTO-7, -9 and -IO | N-Nitrosodiethylamine | 0.02 | <0.02 |
| CCS-WTO-7, -9 and -IO | N-Nitrosodi-n-propylamine | 0.02 | <0.02 |
| CCS-WTO-7, -9 and -IO | N-Nitrosodi-n-butylamine | 0.02 | <0.02 |
| CCS-WTO-7, -9 and -IO | N-Nitrosopiperidine | 0.02 | <0.02 |
| CCS-WTO-7, -9 and -IO | N-Nitrosopyrrolidine | 0.02 | <0.02 |
| CCS-WTO-7, -9 and -IO | N-Nitrosomorpholine | 0.02 | <0.02 |

Testing—Mt Biomethane Biogas Up-Gradation $CO_2$ Capture Pilot Plant-40 Vol % $CO_2$ Biogas An APBS 40 vol % solvent test campaign was conducted at the MT Biomethane biogas up-gradation $CO_2$ capture pilot plant in Zeven, Germany. The APBS solvent was specifically developed to capture 40 vol % $CO_2$ from biogas. The MT Biomethane facility has a biogas up-gradation capacity of 200 to 225 $Nm^3$/hr. Agricultural waste is used to produce biogas using a digester. The heat needed for regeneration of the solvent was provided by hot water.

APES Testing: 40 Vol % $CO_2$ Capture Pilot Plant

The APBS testing was conducted from July 2014 to June 2015 for a detailed parametric test and baseline with an aMDEA solvent. After APBS was used by the plant, $CO_2$ released through the absorber top was negligible. The methane rich stream leaving from the top of the absorber should contain 2% mol of $CO_2$, hence all the optimization test was conducted to meet this requirement.

Net Loading Capacity

It has been observed that the APBS solvent has a net loading capacity for $CO_2$ 1.5 times higher than aMDEA. FIG. 15 illustrates the results of a capacity comparison of aMDEA and APBS. As easily seen, APBS has a higher capacity for $CO_2$ than does aMDEA. A higher capacity of a solvent for $CO_2$ leads to a decrease in circulation rate of the solvent, and hence a reduction in size of the equipment needed.

Recovery of Methane from Biagas

FIG. 9 illustrates methane recovery using APBS solvent. As APBS is inert to methane, the recovery from biogas is >99.9%.

Foaming

One of the major operational problems encountered by aMDEA was foaming once a week, which lead to undue stoppage of plant operations and loss of processing of biogas, and hence revenue. In contrast, the use of APBS did not result in any foaming in the absorber.

Energy

FIG. The average thermal energy for APBS is about 0.55 kWh/$Nm^3$ of raw biogas. The electrical energy was 0.1 kWh/$Nm^3$ of raw biogas.

Make-Up Chemicals

Over a period of time, due to vapor pressure and degradation, performance of aMDEA starts to diminish. Thus, a regular make-up of chemicals are needed to achieve required performance using aMDEA. In the case of APBS, it has been observed that there is no need for make-up chemicals. FIG. MT Biomethane Biagas Up-Gradation $CO_2$ Capture Pilot Plant Testing Use of APBS leads to savings in thermal and electrical energy up to about 20% and to about 40%, respectively. Since APBS did not lead to a single occurrence of foaming, APBS can increase productivity of biogas processing. Due to higher solvent life and very low corrosion rate, the overall investment over the plant life can be decreased by using APBS.

What is claimed is:

1. A method for removing $CO_2$ from a $CO_2$-containing gas, the method comprising:
    contacting an aqueous solvent with the $CO_2$-containing gas to dissolve the $CO_2$ in the aqueous solvent, wherein the aqueous solvent has
    2-amino-2-methylpropanol from 10% to 32% of the solvent by weight,
    2-piperazine-1-ethylamine from 10% to 35% of the solvent by weight,
    diethylenetriamine from 0.1% to 4% of the solvent by weight,
    2-methylamino-2-methyl-1-propanol from 0.8% to 5% of the solvent by weight, and
    a potassium carbonate buffer,
    wherein the 2-piperazine-1-ethylamine and the diethylenetriamine together have vapor pressure less than 0.009 kPa at 25 C, wherein the 2-methylamino-2-methyl-1-propanol and 2-methylamino-2-methyl-1-propanol together have a vapor pressure less than 0.1 kPa at 25 C.

2. The method in claim 1, wherein the aqueous solvent has vapor pressure less than 1.85 kPa at 25 C.

3. The method of claim 1, wherein the $CO_2$-containing gas comprises waste from a combustion process and the process is used to remove a carbon-containing compound in a post-combustion carbon capture process.

4. The method of claim 1, wherein the $CO_2$-containing gas is a flue gas or waste from a combustion process.

5. The method of claim 1, wherein the 2-amino-2-methylpropanol is about 19.5% of the solvent by weight, the 2-piperazine-1-ethylamine is about 22.4% of the solvent by weight, the diethylenetriamine is about 0.2% of the solvent by weight, a 2-methylamino-2-methyl-1-propanol is about 1.4% of the solvent by weight, and a carbonate buffer, wherein the solvent has a vapor pressure less than 1.85 kPa at 25 C.

6. The method of claim 1, wherein the 2-piperazine-1-ethylamine is between 12% and 30% of the solvent by weight, and the diethylenetriamine is between 0.1% and 0.35% of the solvent by weight.

7. The method of claim 1, wherein the 2-amino-2-methylpropanol, 2-piperazine-1-ethylamine, diethylenetriamine, and 2-methylamino-2-methyl-1-propanol together exhibit substantially no foaming when contacted with the $CO_2$-containing gas.

8. The method of claim 1, wherein the 2-methylamino-2-methyl-1-propanol is about 2% of the solvent by weight.

9. The method of claim 1, wherein the potassium carbonate buffer is about 0.1% to about 6% of the solvent by weight.

* * * * *